United States Patent [19]
Thompson

[11] Patent Number: 5,109,399
[45] Date of Patent: Apr. 28, 1992

[54] EMERGENCY CALL LOCATING SYSTEM

[75] Inventor: Robert W. Thompson, McQueeney, Tex.

[73] Assignee: Alamo City Technologies, Inc., Tex.

[21] Appl. No.: 395,896

[22] Filed: Aug. 18, 1989

[51] Int. Cl.$^5$ .................. H04M 11/04; H04M 3/42; H04M 3/00; G08B 25/00

[52] U.S. Cl. ........................... 379/45; 379/49; 379/201; 379/265; 379/142; 340/525; 340/286.14

[58] Field of Search .............. 379/45, 49, 37, 38, 379/42, 96, 142, 265, 201; 340/525–531, 990, 992, 995, 982, 286.01, 286.14

[56] References Cited

U.S. PATENT DOCUMENTS

| | | |
|---|---|---|
| 3,881,060 | 4/1975 | Connell et al. |
| 4,052,569 | 10/1977 | Pirnie, III |
| 4,450,320 | 5/1984 | Ostermann |
| 4,521,645 | 6/1985 | Carroll |
| 4,558,300 | 12/1985 | Goldman |
| 4,651,157 | 3/1987 | Gray et al. |
| 4,660,037 | 4/1987 | Nakamura ............... 364/449 |
| 4,760,531 | 7/1988 | Yasui et al. .............. 364/449 |
| 4,812,980 | 3/1989 | Yamada et al. .......... 364/449 |

FOREIGN PATENT DOCUMENTS

| | | | |
|---|---|---|---|
| 2158278 | 10/1979 | German Democratic Rep. ... | 379/45 |
| 0286973 | 12/1986 | Japan | |
| 0095764 | 4/1988 | Japan | 379/37 |
| 0299659 | 12/1988 | Japan | 379/45 |
| 0053673 | 3/1989 | Japan | 379/45 |
| 1372836 | 11/1974 | United Kingdom | 340/995 |

OTHER PUBLICATIONS

E. S. Delong, Jr., "Making 911 Even Better", *Telephony*, Dec. 14, 1987, pp. 60–63.
Etak Inc., "Dispatch Manager", ® 1986.
Mets, Inc., "Automatic Vehicle Location Vehicle Management System", undated.
Etak Inc., "Etak Emergency Response System", undated.
Ray Blain, "Plant Man's Notebook: Citizens Group Lobbies for Universal Service Survival", *Telephony*, vol. 209, No. 20, Nov. 11, 1985, p. 94.
Ray Blain, "Plant Man's Notebook: Nynex Yellow Pages Let Operators Do the Talking", *Telephony*, vol. 210, No. 8, Feb. 24, 1986, p. 64.
Tom Williams, "Cellular Systems Provide Vehicle Tracking", *Telephony*, Dec. 8, 1986, pp. 46 and 50.
Terry Feldt, "Personal Communications: Navigating by Satellite Gets Cheaper", *Electronics*, Mar. 19, 1987, p. 42.

*Primary Examiner*—James L. Dwyer
*Assistant Examiner*—Wing F. Chan
*Attorney, Agent, or Firm*—Cox & Smith

[57] ABSTRACT

A computer-based system for receiving emergency telephone calls which, upon receipt of the call, provides a voice connection to the operator as well as displaying a map showing the location of the calling party and other relevant textual information. The system is interfaced to a public or private telephone network and provides switching and other telephone functions for controlling and distributing both voice and data to other operators in the system.

11 Claims, 5 Drawing Sheets

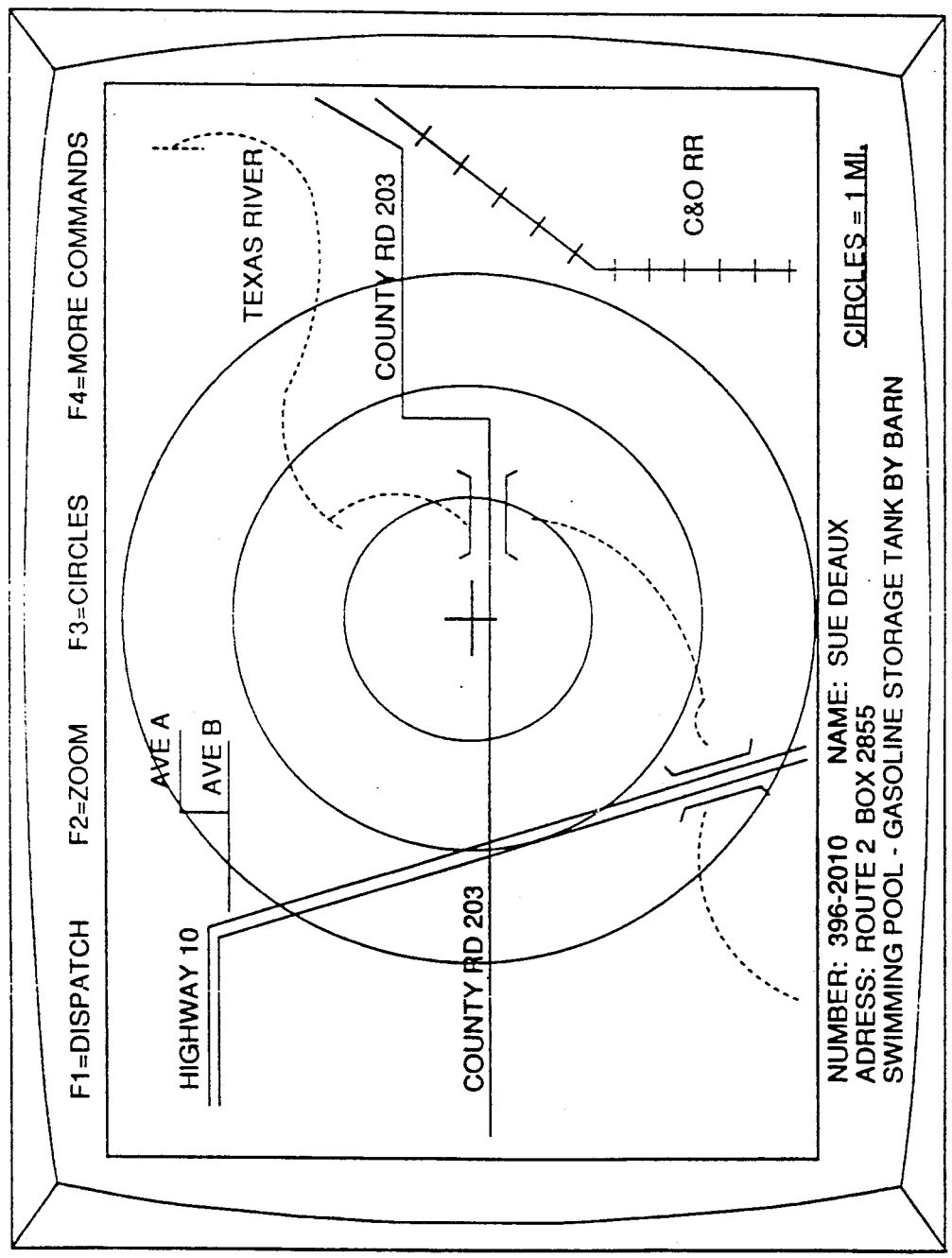

EMERGENCY CALL LOCATING SYSTEM

BACKGROUND OF THE INVENTION

In order to facilitate the dispatching of emergency services such as provided by police, fire departments, ambulances and the like, many urban communities have instituted a universal telephone number, usually 9-1-1, for reporting emergencies of any kind. When the 9-1-1 number is dialed, the call is routed to a central emergency center for voice communication between an emergency operator and the caller. The operator must ascertain from the conversation the caller's location and nature of the emergency. The operator then contacts the appropriate emergency service agency either verbally or by routing the call directly to the agency by means such as are disclosed in U.S. Pat. No. 4,052,569 issued to Pirnie. The nature of the emergency can usually be quickly communicated, but the caller's location may either be unknown to the caller or difficult to describe. A need exists, therefore, for emergency call answering systems which enable a caller's location to be quickly ascertained so that the appropriate emergency service may be quickly dispatched to that location.

One of the best ways for transmitting location information is by means of a visual display. For example, U.S. Pat. No. 4,558,300 issued to Goldman discloses an electronic map for selectively displaying building floor plans indicating a plurality of stations with paths connecting the different stations. By selecting a particular station at a keyboard, a pathway extending from the particular station to the location of the keyboard is visually displayed. Similarly, U.S. Pat. No. 4,421,645 issued to Carroll discloses an alarm system using either fire or burglar alarm detectors which communicate with a micro-computer. When one of the detectors is actuated, the micro-computer having stored therein the position of each detector and the floor plan of each floor of the building communicates that information over telephone lines to the nearest fire station or central monitoring station.

Existing telephone networks are designed such that information containing the telephone number of the calling party is automatically transmitted to a receiving party. This feature called Automatic Number Identification or ANI is utilized by the system disclosed in U.S. Pat. No. 3,881,060 issued to Connell et al. which is hereby incorporated by reference into the present specification. That system utilizes the telephone number of the calling party dialing 911 to automatically route the call to one of a plurality of central receiving stations. Similarly, the emergency telephone system of Mountain Bell in Phoenix, Ariz., as described in a Nov. 11, 1985, issue of *Telephony*, routes emergency calls to a central receiving station where a video screen shows to the operator the telephone number of the calling party as well as the name and address assigned to that phone number. A similar system of Continental Telephone Company in Virginia is described in the Feb. 24, 1986, issue of *Telephony*.

SUMMARY OF THE INVENTION

The present invention is a computer-based system for receiving emergency telephone calls which, upon receipt of the call, automatically displays to the operator a map showing a geographic location associated with the calling party as well as other pre-specified textual information pertaining to the calling party. Means are also provided whereby the operator may distribute to other operators who are part of the system both the voice channel and information necessary to generate another display. Such other operators may include the appropriate emergency service agencies such as police, fire or medical departments.

It is an object of the present invention to provide a system for receiving emergency telephone calls which enables an operator to quickly and positively ascertain the location of the calling party. Although the system is particularly applicable to the receipt of emergency calls, the system also has applicability wherever there is a need to know the location of a calling party, for example, dispatching taxis or delivering parcels.

Other objects, features and advantages of the invention will become evident in light of the following detailed description considered in conjunction with the referenced drawing of a preferred exemplary embodiment according to the present invention.

BRIEF DESCRIPTION OF THE DRAWINGS

FIG. 4 is a representative map display generated by the application software.

DETAILED DESCRIPTION OF THE PREFERRED EMBODIMENT

Figure 1:
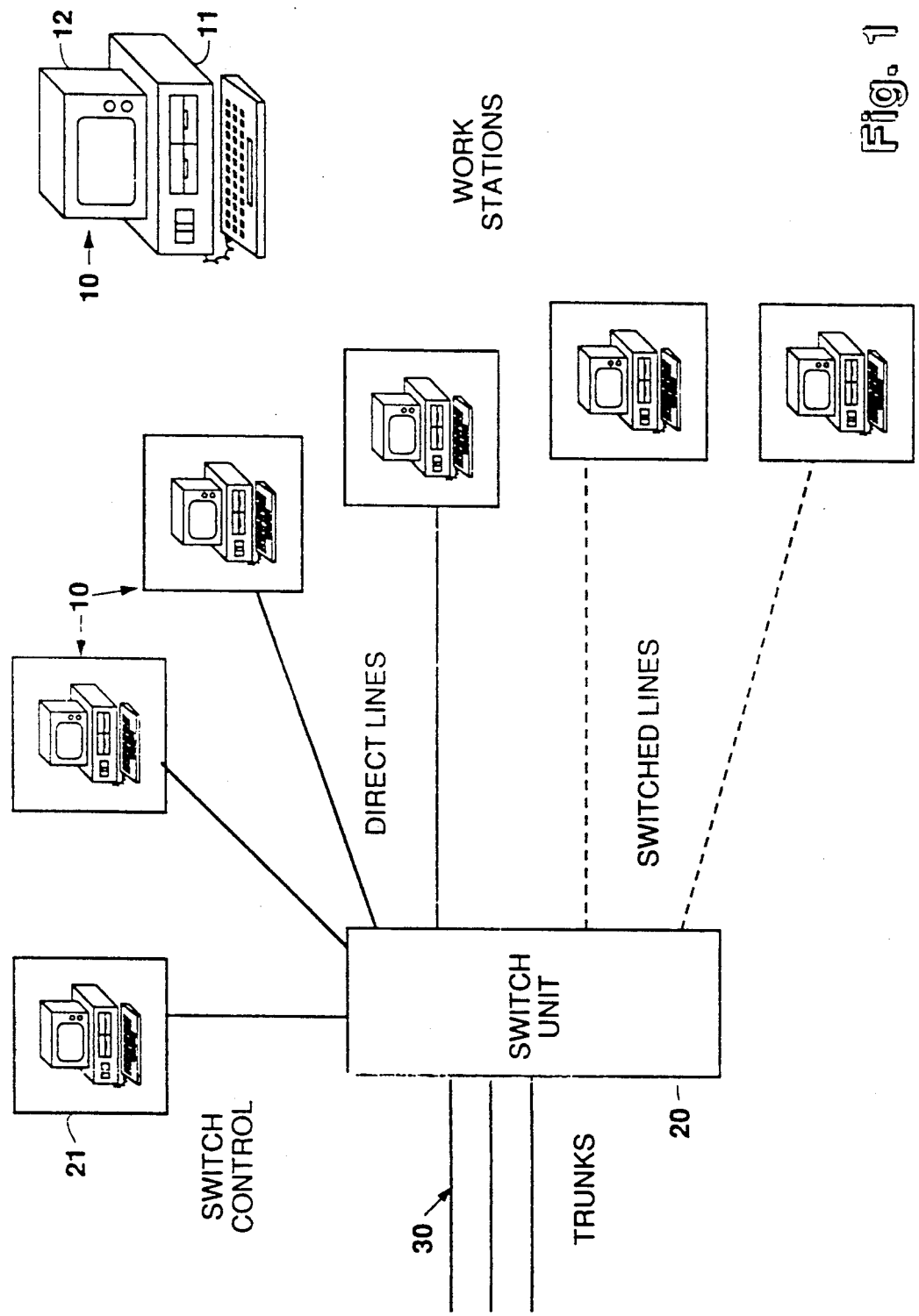
FIG. 1 shows a plurality of individual workstations interfaced to a telephone network.

As shown in FIG. 1, each workstation 10 comprises a computer 11 with keyboard input, a monochrome or color CRT display 12, and, optionally, a telephone communications device and a printer or other hardcopy device (not shown). Each workstation is interfaced to the outside telephone network through the switch unit 20.

The system is interfaced to a public or private telephone network through lines and trunks 30. Signals on the telephone network are sent and received through the switch unit 20 which is controlled by the switch controller 21. An example of a typical switch unit would be the Redcom Model MSD manufactured by Redcom Laboratories of Victor, N.Y. The switch controller 21 is a single computer station dedicated to that purpose. Each telephone or data event presented to the switch unit 20 is received and responded to by the switch controller 21 which, at the user's discretion, may perform event time stamping and recording. The switch controller 21, based on the signals it receives either from the telephone network or from the workstation 10, provides voice communications between the operator and the caller as well as conferencing with other operators. Other data may also be communicated between individual workstations 10 by means of the switch controller. Individual workstations 10 may be connected locally or remotely by non-switched (direct) lines or may be connected over the telephone network. The system also allows the initiation and control of telephone functions which are within the capabilities of the telephone network to which the system is interfaced. Those functions include, but are not limited to, ANI, Called-Party Hold, Forced Disconnect, Ring-Back, Idle Circuit Tone Application, and Switch-Hook Status Indication.

Figure 2:
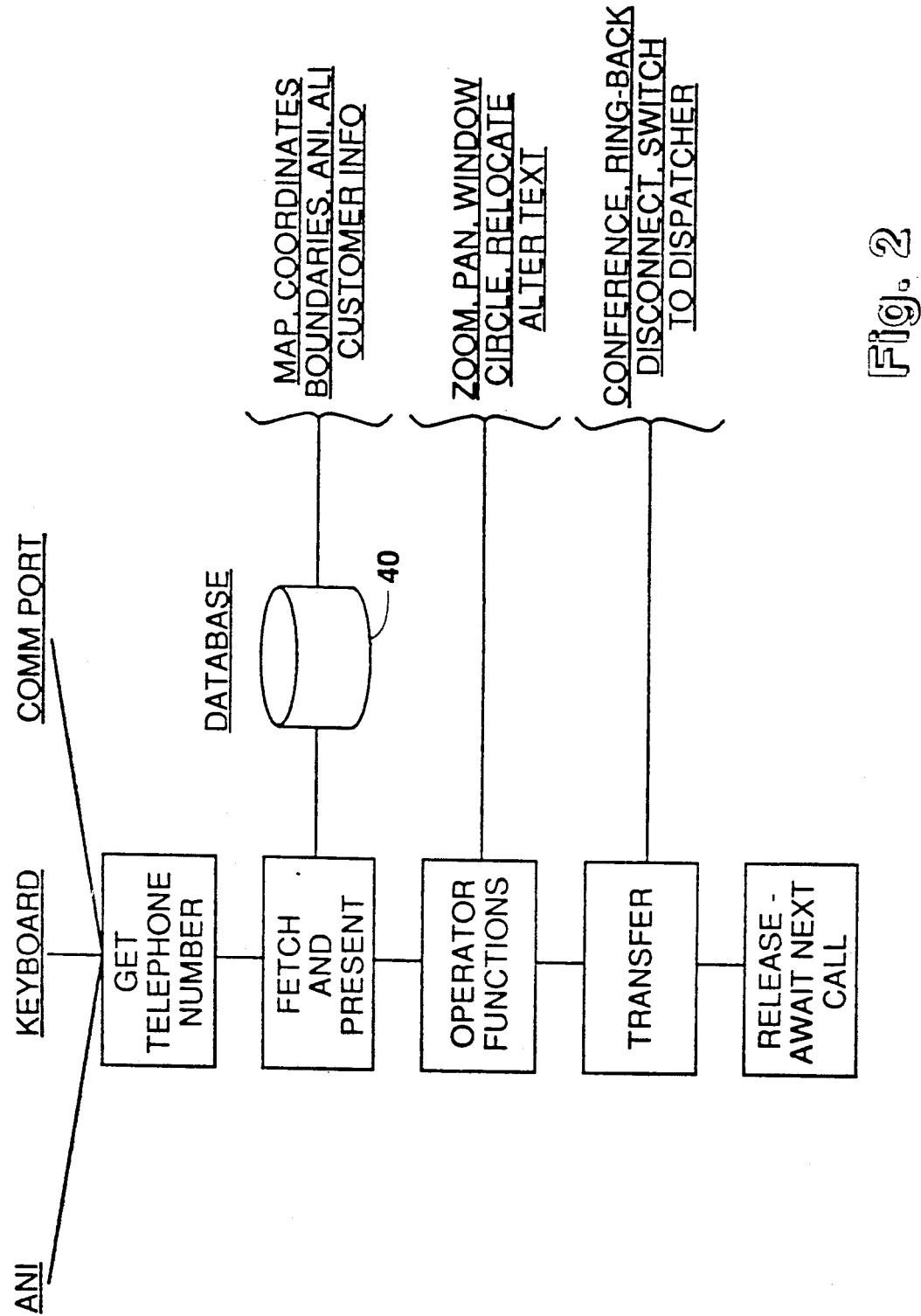
FIG. 2 is a block diagram of the functions performed by an individual workstation.

A block diagram of the functions performed by each workstation is shown in FIG. 2. Each workstation is designed to contain its own data base 40 which obviates the requirement to communicate large amounts of data between computers on a call-by-call basis. Information is supplied to the data base by the user. As is explained below, the database 40 comprises two separate databases: a map database 50 and a customer database 52. Within the map database 50 is a digitized map of the local geographic area. The customer database 52 contains records keyed to calling telephone numbers. Within each record is a pair of map coordinates associated with the particular telephone number as well as textual information. The textual information will typically contain information about the name and address associated with the calling telephone number. The textual information, however, may contain any information considered pertinent to the individual number and which may be useful for emergency services should the need arise. The data base is accessed by inputting the telephone number of the calling party. This can be accomplished either by interpreting tones generated by the telephone network (i.e., Automatic Number Identification), entering the number through the keyboard or receiving the number through a communications port from another workstation. The information is then immediately presented to the operator on the visual display 12. The map presented to the operator may contain virtually any item that can be illustrated as a point, line, curve, symbol or text. The map will typically show the streets, roads, highways, rivers, railroads, boundaries and other landmarks of the area along with their labels or names. A typical display is as shown in FIG. 4. The map generating software which drives the visual display 11 allows the operator via the function keys to zoom-in and zoom-out, relocate the flashing indicator or cross-hair showing the location requiring emergency services to another location on the map, display concentric circles separated by a particular distance, and pan to other parts of the map by moving the cursor.

When a call is received, the operator determines the location of the emergency, either automatically through automatic number identification or through communication with the caller. The appropriate emergency service agency for responding to the call is then added to the call by conferencing. The information needed to generate the visual display from the database may also be sent to the dispatcher's terminal (i.e., the target telephone number and map scaling factor). Once the operator is assured that the dispatcher is in control of the call, the system may be disconnected from that particular call and be ready to receive the next one.

Figure 3A:
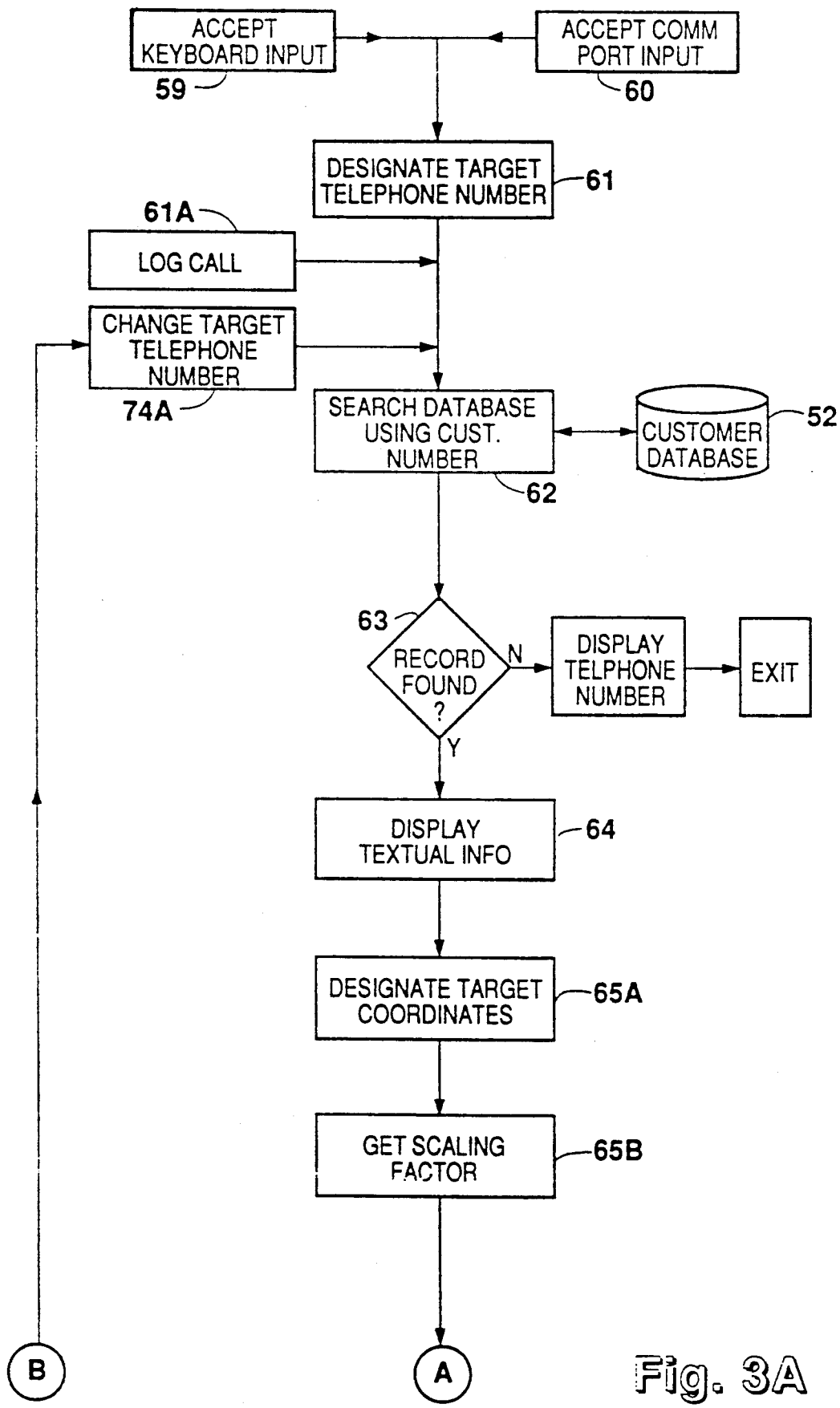
FIGS. 3A and 3B is a flowchart of the application software.
Figure 3B:
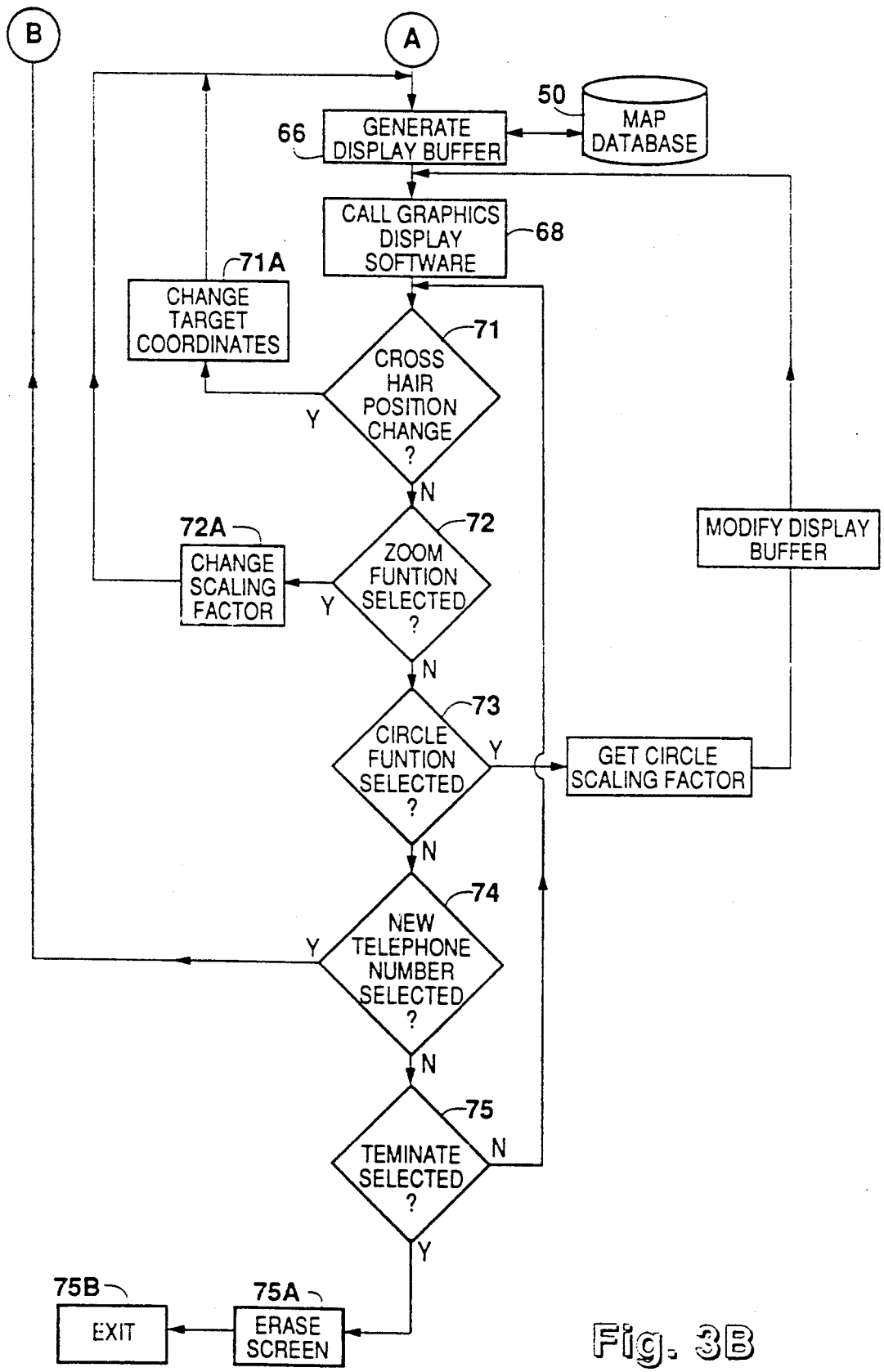

A functional flowchart of the application software used to accomplish the objectives of the present invention as outlined above is shown in FIG. 3. It is expected that the application software will run in a standard software environment which includes an operating system and associated utility programs for I/O (input/output) processing, graphics generation, system initialization and configuration, etc.

Two main databases are used by the system, a map database 50 and a customer database 52. The map database 50 is a two-dimensional array of display elements, each element of the array being identified by a pair of map coordinates. The display elements collectively form a digitized map of the local area showing roads and other landmarks. Textual information may also be contained in the map database 50 to identify the landmarks.

The display elements of the map database 50 are used by graphics software to generate a map on the CRT display 12. The map is generated in accordance with two selectable parameters: a set of target map coordinates and a scaling factor. The scaling factor defines how many of the display elements of the map database 50 are to be used in generating the map display (i.e., the scale of the map). For example, the scaling factor may be set so that all of the display elements are used and the the entire map is displayed. By adjusting the scaling factor via keyboard input, fewer display elements can be used to generate the map display so that only a portion of the entire map is displayed. Dummy values are then inserted into the display buffer in order to fill up the display. Thus, by adjusting the scaling factor, the operator is able to "zoom in" to obtain a map display showing greater detail or "zoom out" to show a greater area.

The particular display elements used by the graphics software are always centered about a pair of target map coordinates. As will be explained below, the target coordinates are automatically set when a telephone number is received by the system. Alternatively, the operator may change the target coordinates at the workstation by keyboard input which moves a visually displayed cursor. In this way, the operator is able to pan to selected areas of the map.

The customer database 52 is a set of records containing information about the phone customers served by the system. Within each record is contained a telephone number, the name of a person or persons associated with that telephone number, an address associated with the telephone number, and a pair of map coordinates associated with the telephone number. It is expected that most of the records will contain the directory listing associated with the telephone number and a pair of map coordinates corresponding to a geographic location associated with the phone number. In order to facilitate searching the database 52 for a record having a particular telephone number, the records are grouped according to the three-digit prefix of the telephone number. Thus, each group contains a maximum of 10,000 records which lessens the search time and provides faster response by the system when an emergency call is received.

After all initialization and configuration tasks have been completed, the system waits for a telephone number to be input into the system either by keyboard input at step 59 or via the communications port at step 60. During most operations, it is expected that a received emergency call will be routed to a workstation from the switching unit 20 with the calling telephone number via ANI which is passed to the application software through the communications port. Alternatively, a telephone number may be passed through the communications port from another workstation.

Once a telephone number is input into the system, that number is then designated as the target telephone number at step 61. At step 61a, the call is logged by printing or storing a message containing the calling telephone number, time, date, and disposition. At step 62, the customer database 52 is searched for a record containing the target telephone number. If such a record is found, the textual information (e.g., name and address associated with the telephone number) is displayed on a portion of the CRT screen. The map coordinates contained in the record are then designated as the target map coordinates. The current map scaling factor is obtained at step 65b which can either be selected by the operator or will assume a specified default value.

Next, at step 66, a buffer containing the particular display elements to be used in the map is generated. The display buffer is generated by accessing the map database 50 and storing the appropriate display elements into the buffer in accordance with the target map coordinates and the map scaling factor. At step 68, the graphics display software is called which generates the map display using the contents of the display buffer. The target coordinates are identified on the map by means of a cross-hair display. Thus, at this stage, the operator is typically provided with a display of the calling telephone number, the name and address of the party associated with the telephone number, and a map of the area surrounding the location of the telephone.

The system now waits for operator input that will modify the display. The position of the cross-hair may be changed by the operator at the keyboard, which position change is detected at step 71. The application software translates the cross-hair position change into a change in the target map coordinates at step 71a, using the particular map scaling factor currently in effect to accomplish the translation. The map display buffer is then regenerated using the new target map coordinates and the graphics display routine is called again. The operator is thus able to pan to selected areas of the view screen.

At step 72, the system checks for operator input from the keyboard which modifies the map scaling factor. As described above, this provides a "zoom" function to the display allowing the operator to view the map in greater or lesser degrees of detail. The map scaling factor is modified at step 72a, the map display buffer being regenerated at step 66 with the new scaling factor. The graphics display routine then displays the contents of the new display buffer.

At step 73, the system detects designated keyboard input which results in the superimposition of concentric circles on the map display according to a specified circle scaling value which defines the distance between the circles. The application software modifies the display elements of the display buffer at step 73b in order to generate the circles. The specified circle scaling factor is obtained at step 73a which may be adjusted by the operator or left to assume a default value. The software uses the circle scale value as well as the particular map scaling factor currently in effect to so modify the display elements. The graphics display routine is then recalled to display the modified display buffer.

At step 74, the system detects operator input from the keyboard that changes the target telephone number. This may be desirable in cases where the calling party wishes to direct emergency services to a telephone location other than the telephone called from. In that case, the software simply passes the new telephone number at step 74a to the target telephone number designation routine at step 61. The display is then regenerated using the updated target telephone number.

Finally, at step 75, the system checks for keyboard input signifying that the operator wishes to terminate the current display. The system then exits the graphics display mode. The view screen is then erased, and the system waits for another call or other operator input.

Although the invention has been described in conjunction with the foregoing specific embodiment, many alternatives, variations and modifications will be apparent to those of ordinary skill in the art. Those alternatives, variations and modifications are intended to fall within the spirit and scope of the appended claims.

What is claimed is:

1. A system for communicating information to an operator associated with a calling telephone number, comprising:

a computer workstation which includes a CRT display and means for operator input;

a map database accessible by the workstation containing a digitized map of the local area wherein each element of the map is associated with a pair of map coordinates;

a customer database accessible by the workstation made up of records, each containing a telephone number, associated textual information and a pair of map coordinates identifying a map location associated with the telephone number;

means for receiving a telephone number into the system;

means for generating a display at said workstation of the map stored in said map database wherein the displayed map is centered about the map coordinates associated with said received telephone number;

means for visually signifying the map coordinates of the received telephone number on the map display; and, means for displaying the textual information associated with said received telephone number.

2. The system as set forth in claim 1 further comprising means responsive to operator input from said workstation for changing the map coordinates about which the map display is centered.

3. The system as set forth in claim 1 further comprising means for superimposing concentric circles on the map display centered about the map coordinates of the received telephone number wherein the concentric circles are spaced according to a selected scaling factor.

4. The system as set forth in claim 1 wherein either all or a portion of the map is displayed in lesser or greater degrees of detail according to a map scaling factor.

5. The system as set forth in claim 4 further comprising means responsive to operator input from the workstation for adjusting the size of the portion of the map displayed at the workstation according to the selected map scaling factor.

6. The system as set forth in claim 1 wherein the means for receiving a telephone number into the system comprises:

a keyboard associated with said workstation; and, a communications port for accepting a telephone number communicated over a transmission line.

7. The system as set forth in claim 6 additionally comprising:

a switching unit for interfacing an outside telephone network to the workstation; and, means responsive to said workstation and the telephone network for controlling the switching unit.

8. The system as set forth in claim 7 wherein the telephone number is received into the system using automatic number identification.

9. In a data processing system having means for operator input and graphics display, a method for displaying information associated with customer telephone numbers, comprising the steps of:

(a) receiving a telephone number which is then designated as the target telephone number;

(b) displaying the target telephone number;

(c) searching a customer database for a record containing the target telephone number, designated as the target record, wherein each record of the database contains a telephone number, a pair of map coordinates corresponding to a geographic location associated with the telephone number, and additional textual information associated with the telephone number;

(d) displaying the textual information contained in the target record;

(e) designating the map coordinates of the target record as the target map coordinates;

(f) generating a display buffer containing visual display elements for passage to a graphics display routine by accessing a map database containing a two-dimensional array of visual display elements representing a map of the local area, wherein the display buffer is constructed so as to result in the generation of a map of the local area centered about the target map coordinates, the number of display elements of the map database used in generating the display buffer being in accordance with a preselected map scaling factor;

(g) displaying a map of the local area by calling the graphics display routine with the generated display buffer, wherein the target map coordinates are visually signified; and, (h) changing the target map coordinates in accordance with operator input and returning to step (e) to generate a new display buffer for displaying a map of the local area centered about the new target map coordinates, thereby allowing the operator to pan to selected areas of the display.

10. The method as set forth in claim 9 additionally comprising the step of changing the map scaling factor in accordance with operator input and returning to step (f), thereby allowing the operator to obtain the map display in greater or lesser degrees of detail.

11. The method as set forth in claim 9 additionally comprising the step of modifying the display buffer in accordance with operator input to superimpose concentric circles around the target map coordinates, the concentric circles being separated by a distance in accordance with a selected circle scaling factor and the current map scaling factor.

* * * * *